(12) United States Patent
Walker et al.

(10) Patent No.: US 10,694,654 B2
(45) Date of Patent: Jun. 30, 2020

(54) AUTOMATIC DIVIDER HEIGHT POSITIONING FOR AN AGRICULTURAL HARVESTER

(71) Applicant: CNH Industrial America LLC, New Holland, PA (US)

(72) Inventors: Eric Walker, Narvon, PA (US); Kyle Lauff, Pilesgrove, NJ (US)

(73) Assignee: CNH Industrial America LLC, New Holland, PA (US)

( * ) Notice: Subject to any disclaimer, the term of this patent is extended or adjusted under 35 U.S.C. 154(b) by 217 days.

(21) Appl. No.: 15/882,464

(22) Filed: Jan. 29, 2018

(65) Prior Publication Data
US 2019/0230841 A1    Aug. 1, 2019

(51) Int. Cl.
| | | |
|---|---|---|
| A01B 63/00 | (2006.01) | |
| A01D 45/02 | (2006.01) | |
| A01D 63/04 | (2006.01) | |
| A01D 63/00 | (2006.01) | |

(52) U.S. Cl.
CPC .......... *A01B 63/008* (2013.01); *A01D 45/021* (2013.01); *A01D 63/00* (2013.01); *A01D 63/04* (2013.01)

(58) Field of Classification Search
CPC .... A01B 63/008; A01D 45/021; A01D 63/04; A01D 63/00; A01D 41/141; A01D 41/147; A01D 43/081
See application file for complete search history.

(56) References Cited

U.S. PATENT DOCUMENTS

| | | | |
|---|---|---|---|
| 3,349,549 A | | 10/1967 | Van Der Lely |
| 3,722,193 A | * | 3/1973 | Strubbe ................ A01D 41/141 56/208 |
| 4,193,250 A | | 3/1980 | Kessens et al. |
| 4,227,368 A | * | 10/1980 | Mossman ............ A01D 45/021 56/106 |
| 4,269,018 A | * | 5/1981 | Pickett .................. A01D 63/04 56/119 |
| 4,312,177 A | * | 1/1982 | Maier .................. A01D 41/141 56/10.2 R |
| 4,409,778 A | * | 10/1983 | McNaught ........... A01D 41/141 56/10.2 A |

(Continued)

FOREIGN PATENT DOCUMENTS

| | | | |
|---|---|---|---|
| CN | 202406562 U | * 9/2012 | ............. A01D 63/04 |
| EP | 0848898 A1 | 6/1998 | |
| EP | 2727453 A1 | 5/2014 | |

OTHER PUBLICATIONS

Extended European Search Report for EP Application No. 19154120.0 dated Jun. 28, 2019 (eight pages).

*Primary Examiner* — Arpad Fabian-Kovacs
(74) *Attorney, Agent, or Firm* — Peter Zacharias; Patrick Sheldrake

(57) ABSTRACT

A harvester including: a chassis; an adjustable feeder housing carried by the chassis and defining a face angle relative to a ground plane; a header carried by the chassis, the header including: a header frame; at least one harvesting element carried by the header frame; and at least one divider pivotably carried by the header frame and defining a divider angle relative to the ground plane; and a mechanical linkage coupling the feeder housing to the at least one divider such that the divider angle is adjustable independently of movement of the header frame.

3 Claims, 3 Drawing Sheets

(56) References Cited

U.S. PATENT DOCUMENTS

| | | | | |
|---|---|---|---|---|
| 4,445,314 A * | 5/1984 | Gust | A01D 41/147 56/119 |
| 4,476,667 A * | 10/1984 | Moss | A01D 45/021 56/106 |
| 4,538,404 A * | 9/1985 | Heimark, Jr. | A01D 45/021 56/119 |
| 4,757,673 A * | 7/1988 | Gayman | A01D 63/04 172/502 |
| 5,704,200 A * | 1/1998 | Chmielewski, Jr. | A01D 41/141 56/10.2 E |
| 5,910,092 A | 6/1999 | Bennett | |
| 6,244,026 B1 * | 6/2001 | Minnihan | A01D 65/02 56/119 |
| 6,247,297 B1 | 6/2001 | Becker | |
| 6,513,313 B1 * | 2/2003 | Bennett | A01D 45/021 56/119 |
| 6,813,873 B2 | 11/2004 | Allworden et al. | |
| 7,162,855 B2 * | 1/2007 | Boeckmann | A01D 41/144 56/15.2 |
| 7,350,345 B2 * | 4/2008 | Slabbinck | A01D 63/00 56/119 |
| 7,647,753 B2 | 1/2010 | Schlipf | |
| 7,681,387 B2 * | 3/2010 | Guldenpfennig | A01D 45/021 56/119 |
| 7,908,838 B2 * | 3/2011 | Hohlfeld | A01D 43/081 56/228 |
| 8,387,352 B2 * | 3/2013 | Silver | A01D 45/021 56/319 |
| 9,032,700 B2 * | 5/2015 | Lohrentz | A01D 63/00 56/119 |
| 9,226,447 B2 * | 1/2016 | Noll | A01D 41/148 |
| 9,253,944 B2 | 2/2016 | Hulstein et al. | |
| 9,532,505 B2 * | 1/2017 | Long | A01D 45/021 |
| 9,609,806 B2 * | 4/2017 | Schlipf | A01D 41/141 |
| 9,642,307 B2 * | 5/2017 | Long | A01D 45/021 |
| 9,980,431 B2 * | 5/2018 | Long | A01D 34/006 |
| 9,992,935 B2 * | 6/2018 | Van Overschelde | A01D 63/04 |
| 2002/0035826 A1 * | 3/2002 | Albinger | A01D 41/144 56/109 |
| 2003/0041579 A1 * | 3/2003 | Wuebbels | A01D 41/144 56/15.2 |
| 2006/0174603 A1 * | 8/2006 | Mossman | A01D 45/021 56/314 |
| 2012/0042624 A1 * | 2/2012 | Lohrentz | A01D 45/021 56/119 |
| 2014/0260165 A1 | 9/2014 | Lohrentz | |
| 2015/0195991 A1 * | 7/2015 | Ricketts | A01D 41/141 56/249 |

* cited by examiner

AUTOMATIC DIVIDER HEIGHT POSITIONING FOR AN AGRICULTURAL HARVESTER

BACKGROUND

Harvesters such as combine harvesters, windrowers, tractors, and forage harvesters, are equipped with headers to harvest crops in a field. A typical header includes a header frame carrying one or more harvesting elements, such as snap rolls or cutter bars, that engage the crops to separate the crop material from the field for collection by the harvester. The header also typically includes some type of conveying mechanism, such as a pair of rotating augers or belts, that will convey collected crop material toward a center of the header and rearwardly into the harvester for further processing and/or transport. For some types of harvesters, such as combine harvesters, various specific header constructions are known for harvesting specific crops, e.g., corn headers for harvesting corn, wheat headers for harvesting wheat, etc.

A typical corn header construction includes a header frame carrying a plurality of row units for harvesting corn. Each row unit includes a pair of spaced apart deck plates. A corn stalk channel is defined between two paired deck plates to define a stalk channel distance, which is roughly equal to the diameter of a corn stalk. As the vehicle travels through a field where corn is present, corn stalks enter the corn stalk channels. Below the deck plates, a pair of snap rolls are arranged that engage the caught corn stalks to pull the corn stalks downward. The corn stalk channel between the deck plate is wide enough to allow entry of the corn stalks, but is too narrow for the corn ears to pass through the channel. As the snap rolls pull the corn stalk downwardly, the corn ear eventually impacts the deck plates and snaps off of the corn stalk, separating the corn ear from the field. The corn stalks may be cut before, during, or after the corn ear is being separated from the stalk to remove the stalk from the field and, in some harvesters, be processed into residue for spreading on the field. The separated corn ears can then be conveyed toward a processing device.

A typical grain header, on the other hand, includes a header frame carrying one or more cutting elements, such as cutter bars, that reciprocate to engage and cut the wheat to collect the grain. The cutting element(s) can be reciprocated by an epicyclical drive or wobble box, with the height of the cutting elements, relative to the ground, determining how much of the crop is separated from the field, i.e., the cut height of the stubble that remains on the field. After the crop material is cut by the cutting element(s), a rotating auger or draper belt can transport the cut crop material toward a center of the header to a header conveyor, which conveys the crop material rearwardly for further processing.

Regardless of whether the header is a corn header or a grain header, many header constructions also include a plurality of dividers spaced apart from each other along the width of the header. The dividers of a corn header or a grain header help to direct crop material toward the stalk channels or cutting elements, respectively, during travel of the vehicle. In this respect, the dividers account for unevenness in the rows of crops, ensuring that the crops enter the stalk channels or cutting elements in a row-wise fashion and encouraging an even cut height of the crops.

On many combine harvesters, the header is removably mounted to and supported by the feeder housing, which is carried by the chassis of the combine. Generally, adjusting an angle of the feeder face of the feeder housing requires manual feeder face adjustment using wrenches.

SUMMARY

The present disclosure relates to a harvester with a header having dividers that can be adjusted together or individually in response to, for example, a change in a face angle of a feeder housing.

In some exemplary embodiments disclosed herein, a harvester includes: a chassis; an adjustable feeder housing carried by the chassis and defining a face angle relative to a ground plane; a header carried by the chassis, the header including: a header frame; at least one harvesting element carried by the header frame; and at least one divider pivotably carried by the header frame and defining a divider angle relative to the ground plane; and a mechanical linkage coupling the feeder housing to the at least one divider such that the divider angle is adjustable independently of movement of the header frame.

In some exemplary embodiments disclosed herein, a harvester includes: a chassis; an adjustable feeder housing carried by the chassis and defining a face angle relative to a ground plane; a header carried by the chassis, the header including: a header frame; at least one harvesting element carried by the header frame; and at least one divider pivotably carried by the header frame and defining a divider angle relative to the ground plane; a winder configured to rotate in response to the face angle changing; and a tensioner coupled to the at least one divider and wound around the winder.

In some exemplary embodiments disclosed herein, a harvester includes: a chassis; and a header carried by the chassis. The header includes: a header frame; at least one harvesting element carried by the header frame; a plurality of dividers pivotably carried by the header frame, each of the plurality of dividers defining a respective divider angle relative to a ground plane; and a plurality of actuators carried by the header frame, each of the plurality of actuators coupling to a respective one of the plurality of dividers and being configured to control the respective divider angle of the respectively coupled divider.

One possible benefit that may be realized by exemplary embodiments disclosed herein is the divider angle of one or more dividers can be maintained constant when the face angle changes to encourage a constant cut height during harvesting.

Another possible benefit that may be realized by exemplary embodiments disclosed herein is the divider angle of each divider can be adjusted individually, which may encourage a constant cut height in various scenarios.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester and header, reference is made to the accompanying figures, wherein.

DETAILED DESCRIPTION

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is a combine harvester, a windrower, or a forage harvester. In some embodiments, the harvester is a combine harvester.

The term "material" as used herein is defined as a numerous individual items that are harvested or collected by the harvester. In some embodiments, the material is agricultural crop, such as corn or wheat.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Figure 1:
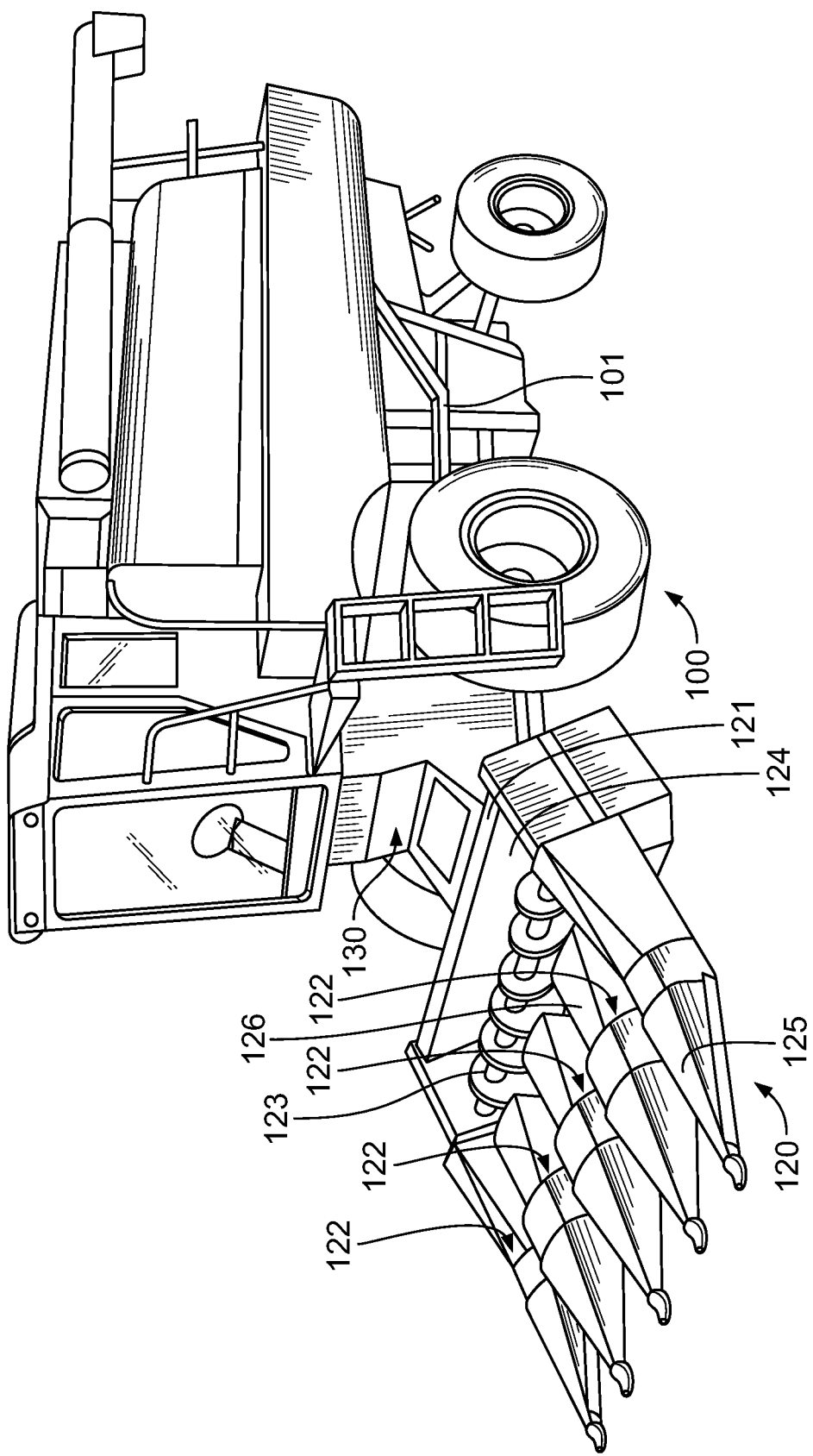
FIG. 1 is a perspective view of a known harvester equipped with a corn header.

Referring now to the drawings, and more particularly to FIG. 1, a known harvester 100, which may be referred to as a "combine" or "combine harvester," is shown. The harvester 100 includes a chassis 101 and a header 120 carried by the chassis 101. As shown, the header 120 is configured as a corn header for harvesting corn and is cantilevered in the front of the combine 100 and connected to the combine 100 by a feeder housing 130. It should be appreciated that while the header 120 shown herein is configured to harvest corn, the present disclosure is also applicable to other header constructions such as, for example, headers configured to harvest wheat or other crops.

The illustrated header 120 includes a header frame 121 carrying four row units 122, which harvest four rows of corn simultaneously. In other exemplary embodiments, the number of rows of corn that may be harvested may be different than four, for example greater than four or less than four. Ears of corn are stripped from each of the four rows by the header 120 and then carried by a conveyor 123, such as an auger, in a trough 124 to the feeder housing 130. Feeder housing 130 carries the collected ears rearwardly and upwardly into a threshing assembly (not shown) in the body of combine 100. Each of the row units 122 may have an associated divider 125 and a hood 126, as is known.

Figure 2:
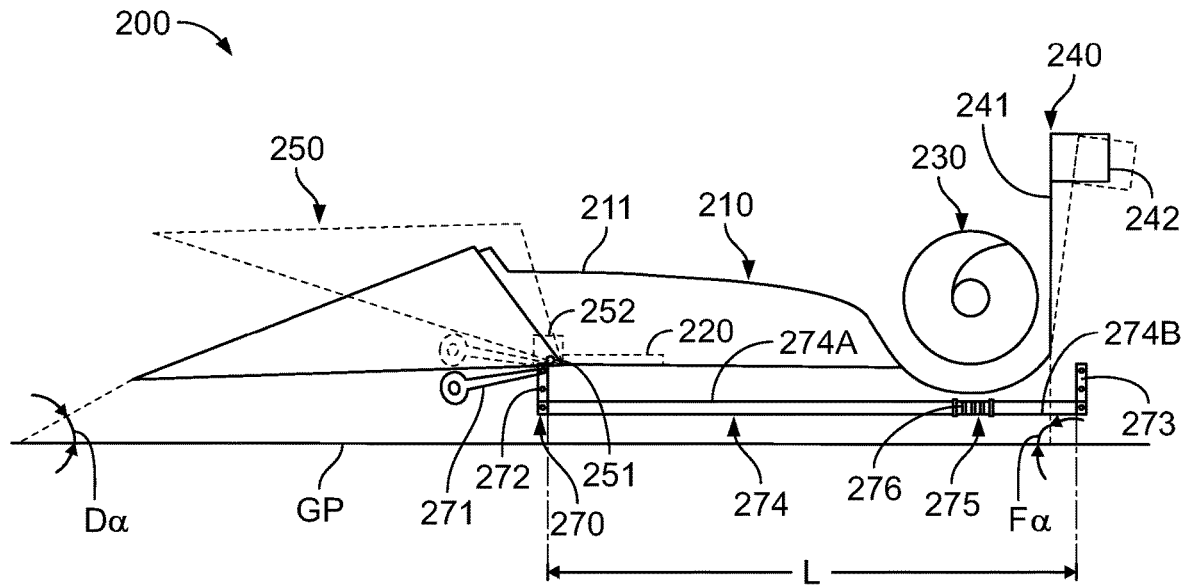
FIG. 2 is a side view of an exemplary embodiment of a header formed in accordance with the present disclosure.

Referring now to FIG. 2, an exemplary embodiment of a header 200 that may be incorporated in the harvester 100 is illustrated. The header 200 includes a header frame 210 carrying one or more harvesting elements 220, which may be a pair of deck plates, to harvest standing crops in a field. While the harvesting elements 220 are illustrated and described herein as deck plates, which are also commonly known as "stripping plates," it should be appreciated that the harvesting element(s) 220 can have other configurations suitable for removing standing crops, such as a cutterbar, sickle, etc. The header frame 210 may, in some exemplary embodiments, include a hood 211 that can house and protect components of the header 200 during operation, as well as assist in guiding cut crop material toward a conveyor 230, shown as an auger, that can convey the cut crop material toward an adjustable feeder housing 240, which is described further herein. The header 200 may be adjustable by connecting to the feeder housing 240, as is known.

As can be seen, the header 200 includes a divider 250 that is pivotably carried by the header frame 210 and can direct standing crop material toward the harvesting elements 220. As used herein, the divider 250 is "pivotably carried" by the header frame 210 in the sense that the divider 250 is connected to the header frame 210 in a manner that allows pivoting of the divider 250 relative to the header frame 210 to, for example, adjust a divider angle Dα defined by the divider 250 with respect to a ground plane GP. In some exemplary embodiments, the divider 250 may be pivotably connected to the header frame 210 at a pivot point 251, which may be a pivot pin or similar element, defining a pivoting axis of the divider 250. Optionally, a pivot lock 252 may be associated with the pivot point 251 to reversibly lock and prevent pivoting of the divider 250 when, for example, the header 200 is being transported. While only one divider 250 is illustrated in FIG. 2, it should be appreciated that the header 200 may include more than one divider 250, as is known.

As previously described, the feeder housing 240 is adjustable so a face angle Fα of the feeder housing 240 defined relative to the ground plane GP can be adjusted. In some exemplary embodiments, the feeder housing 240 is pivotably carried by the chassis 101 of the harvester 100 and can be adjusted manually by a user or by activating one or more respectively connected actuators (not shown). The face angle Fα of the feeder housing 240 can be defined by a front face 241 of the feeder housing 240 or, alternatively, by a back face 242 of the feeder housing 240. It should be appreciated that when the feeder housing 240 pivots, both the front face 241 and back face 242 will pivot, and thus pivoting of the feeder housing 240 will change the face angle Fα regardless of what face 241, 242 is used for measuring the face angle Fa.

When a header is mounted to an adjustable feeder housing, a change in the face angle of the feeder housing also tends to cause a corresponding change in the divider angle of the crop divider(s) since the divider(s) is carried by the header frame, which pivots with the feeder housing. During operation, the cut height is determined by operator input and the height of the divider relative to the ground plane, i.e., the header pivots about the cut height. On a grain header, an angle of the cutter is determined by the angle of the feeder face and the divider is adjusted to complement the angle of the cutter, i.e., the header also pivots about the cut height. In either situation, a change in the face angle of the feeder housing also tends to change the height of the dividers, with tipping the feeder housing forward causing the dividers to lower and tipping the feeder housing backwards causing the dividers to raise. In other words, the divider height tends to change following a change in the face angle of the feeder housing when the header is mounted to the feeder housing, making it difficult for the header to properly address the crop and maintain a constant cut height relative to the ground.

In order to control changes in the orientation of the divider 250 when the face angle Fα changes, the header 200 includes a mechanical linkage 270 coupling the feeder housing 240 to the divider 250 such that the divider angle Dα is adjustable independently of movement of the header frame 210. For example, when the header frame 210 is mounted to the feeder housing 240, the mechanical linkage 270 can maintain the divider angle Dα constant even when the face angle Fα changes. As shown, the mechanical linkage 270 can include a divider support 271 bearing on the divider 250 to support the divider 250 and adjust the orientation of the divider 250 relative to the pivot point 251 when the divider support 271 pivots. The divider support 271 can be pivotably coupled to a divider pivoting bracket 272 that is connected to a feeder pivoting bracket 273 by a linkage rod 274 or similar element so pivoting of the feeder pivoting bracket 273 can cause a corresponding pivoting of the divider pivoting bracket 272. The feeder pivoting bracket 273 can be connected to a portion of the feeder housing 240, such as the back face 242, so pivoting of the feeder housing 240 that adjusts the face angle Fα also causes pivoting of the feeder pivoting bracket 273.

When the feeder housing 240 pivots and the face angle Fα changes, as illustrated in dashed lines, the header frame 210 and carried divider 250 also tend to responsively pivot when the header 200 is mounted to the feeder housing 240, as illustrated in dashed lines. By coupling the divider 250 to the feeder housing 240 with the mechanical linkage 270 that allows pivoting of the divider 250 independently of movement of the header frame 210, the divider 250 can maintain its respective divider angle Dα constant even when the header frame 210 moves due to the feeder housing 240 pivoting. As illustrated in FIG. 2, the feeder housing 240 tilting rearwards tends to raise the header frame 210 but also causes the mechanical linkage 270 to pivot the divider support 271 downward, relative to the pivot point 251, and account for the tendency of the header frame 210 raising to maintain a constant divider angle Dα relative to the ground plane GP, i.e., maintain a constant cut height. The mechanical linkage 270, therefore, can link pivoting movement of the feeder housing 240 into pivoting movement of the pivot brackets 272, 273 to compensate for the tendency of the divider angle Dα to change when the feeder housing 240 pivots and to maintain the cut height without requiring any additional input by the user.

Optionally, the mechanical linkage 270 may include a length adjustor 275 coupling two portions 274A, 274B of the linkage rod 274 to one another and having a threading 276 to allow adjustment of a length L of the linkage rod 274. In some exemplary embodiments, the length adjustor 275 may be a turnbuckle or similar element. A user may rotate or otherwise manipulate the length adjustor 275 to adjust the length L of the linkage rod 274, as desired.

In some exemplary embodiments, the header 200 includes a plurality of dividers 250 that are each pivotably carried by the header frame 210 and mechanically linked to the feeder housing 240. Each of the dividers 250 may have an associated divider support 271 and define a corresponding divider angle Dα relative to the ground plane GP. To simultaneously maintain the divider angle Dα of each divider 250 constant responsively to a change in the face angle Fα of the feeder housing 240, the header 200 may include a coordinating linkage 277 that pivotably couples each of the divider supports 271 to the mechanical linkage 270, such as to the divider pivoting bracket 272, so only one divider pivoting bracket 272 is needed to pivot a plurality of dividers 250. In some exemplary embodiments, the coordinating linkage 277 can be a rod or similar element that extends laterally across the header 200 and each divider support 271 pivotably couples to the coordinating linkage 277. In some exemplary embodiments, each divider 250 can have a separate mechanical linkage 270 coupling the respective divider 250 to the feeder housing 240.

Figure 3:
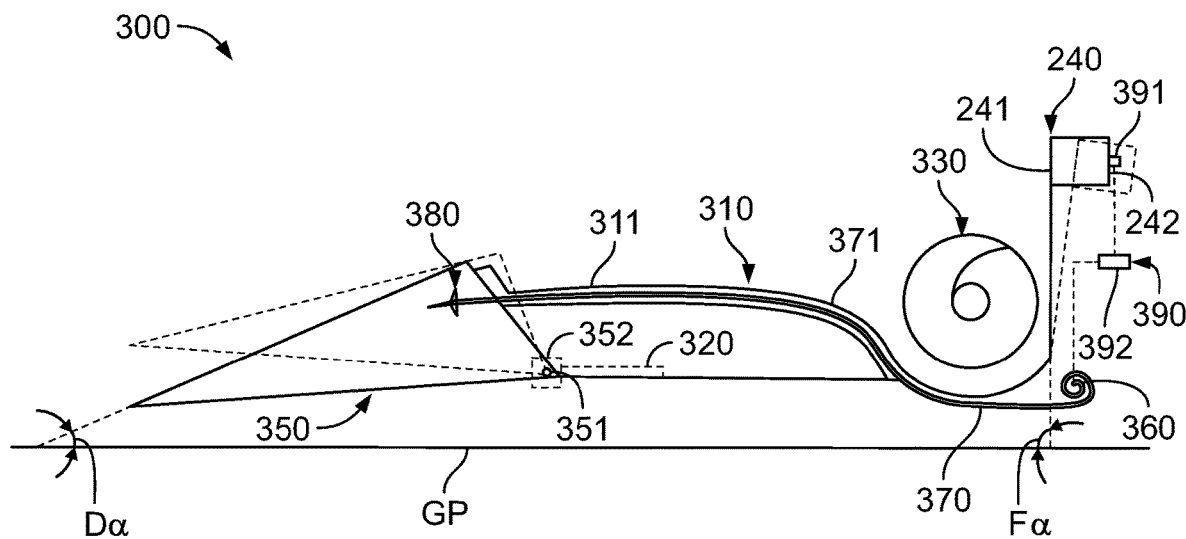
FIG. 3 is a side view of another exemplary embodiment of a header formed in accordance with the present disclosure.

Referring now to FIG. 3, another exemplary embodiment of a header 300 is shown that is similar to the header 200 shown in FIG. 2. The header 300 includes a header frame 310 carrying one or more harvesting elements 320, which may be a pair of deck plates, to harvest standing crops in a field. While the harvesting elements 320 are illustrated and described herein as deck plates, it should be appreciated that the harvesting element(s) 320 can have other configurations suitable for removing standing crops, such as a cutterbar, sickle, etc. The header frame 310 may, in some exemplary embodiments, include a hood 311 that can house and protect components of the header 300 during operation, as well as assist in guiding cut crop material toward a conveyor 330, shown as an auger, that can convey the cut crop material toward the adjustable feeder housing 240, which is previously described. The header 300 may be adjustable by connecting to the feeder housing 240, as is known.

As can be seen, the header 300 includes a divider 350 that is pivotably carried by the header frame 310 and can direct standing crop material toward the harvesting elements 320. As used herein, the divider 350 is "pivotably carried" by the header frame 320 in the sense that the divider 350 is connected to the header frame 320 in a manner that allows pivoting of the divider 350 relative to the header frame 320 to, for example, adjust a divider angle Dα defined by the divider 350 with respect to a ground plane GP. In some exemplary embodiments, the divider 350 may be pivotably connected to the header frame 310 at a pivot point 351, which may be a pivot pin or similar element, defining a pivoting axis of the divider 350. Optionally, a pivot lock 352 may be associated with the pivot point 351 to reversibly lock and prevent pivoting of the divider 350 when, for example, the header 300 is being transported. While only one divider 350 is illustrated in FIG. 3, it should be appreciated that the header 300 may include more than one divider 350, as is known.

As previously described, a change in the face angle Fα tends to change the divider angle Dα of the divider 350 and the cut height of the header, which is illustrated in dashed lines in FIG. 3. To counteract the tendency of the divider angle Dα to change when the face angle Fα changes, the header 300 includes a winder 360 that is configured to rotate in response to the face angle Fα changing and a tensioner 370 coupled to the divider 350 and wound around the winder 360. By winding the tensioner 370 around the winder 360, rotation of the winder 360 can cause pivoting of the divider 350 relative to the pivot point 351 so the divider angle Dα does not change when the face angle Fα changes. In some exemplary embodiments, the winder 360 can be a drum and the tensioner 370 can be at least one of a belt, strap, cable, or other element that provides adjustable tension to the divider 350 in order to control the divider angle Dα of the divider 350. Optionally, the tensioner 370 can couple to a length adjustor 380, such as a turnbuckle, connected to the divider 350 that can allow adjustment of the total effective length of the tensioner 370. It should be appreciated that the winder 360 and tensioner 370 can be parts of a mechanical linkage coupling the feeder housing 240 to the divider 350.

In some exemplary embodiments, the winder 360 can be directly mechanically linked to the feeder housing 240 so pivoting of the feeder housing 240 causes a corresponding rotation of the winder 360 and adjustment of the tension in the tensioner 370. The winder 360 may, for example, be mechanically linked to the back face 242 of the adjustable feeder housing 240 so that the winder 360 rotates as the back face 242 pivots. In some exemplary embodiments, the tensioner 370 extends through a tensioner guide 371 formed in the header frame 310, such as in the hood 311, to keep the tensioner 370 in place during rotation of the winder 360. Similarly to the previously described mechanical linkage 270, the winder 360 and tensioner 370 of the header 300 can be configured such that rearward tilting of the feeder housing 240 causes downward pivoting of the front of the divider 350, and vice versa, to maintain the divider angle Dα constant when the face angle Fα changes.

In some exemplary embodiments, the header includes a winder control assembly 390 including an angle sensor 391 associated with the feeder housing 240 and a controller 392 operatively coupled to the angle sensor 391 and the winder 360. The angle sensor 391 can be associated with the feeder housing 240 to measure the face angle Fα directly or, in some exemplary embodiments, changes in the face angle Fα and transmit angle signals to the controller 392 that convey the face angle Fα has changed. The controller 392 can be configured to detect a change in the face angle Fα and activate the winder 360 to rotate responsively to detecting the change in the face angle Fα. In this sense, the controller 392 can selectively control the divider angle Dα by controlling rotation of the winder 360 to adjust the tension in the tensioner 370 and change or maintain the divider angle Dα independently of movement of the header frame 310. It should be appreciated that, in some exemplary embodiments, a user can also interact with the controller 392 from the cab using, for example, a touch screen display to adjust the divider angle Dα, in response to a change in the face angle Fα or otherwise. It should be further appreciated that each divider 350 of the header 300 can be coupled to a corresponding tensioner 370 wound around a single winder 360 or, in some exemplary embodiments, each corresponding tensioner 370 can be wound around a respective winder 360 for individual adjustment of each divider 350.

Figure 4:
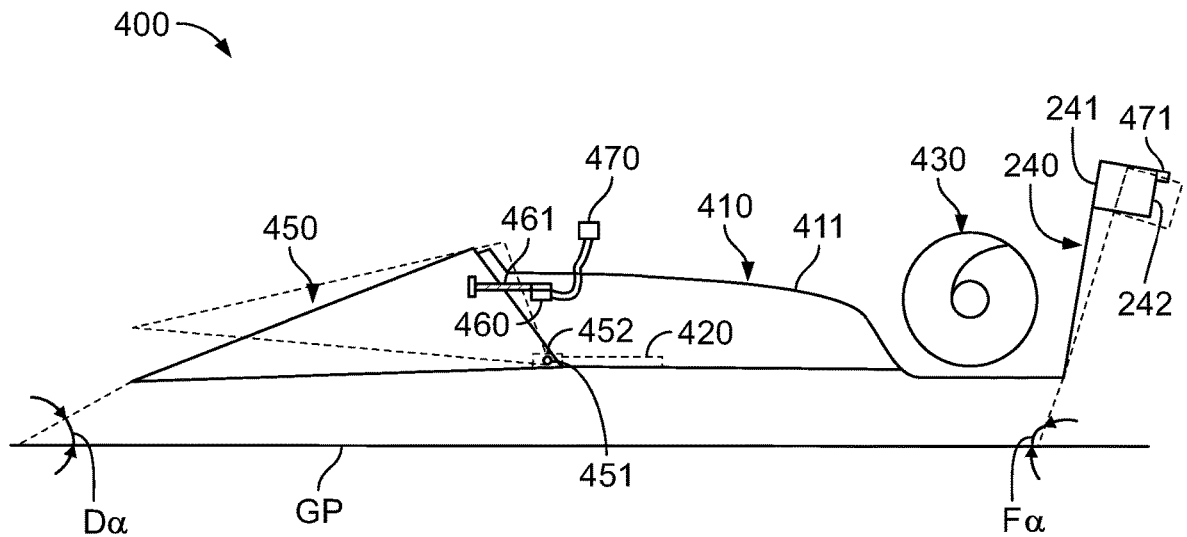
FIG. 4 is a side view of yet another exemplary embodiment of a header formed in accordance with the present disclosure.

Referring now to FIG. 4, another exemplary embodiment of a header 400 is shown. The header 400 includes a header frame 410 carrying one or more harvesting elements 420, which may be a pair of deck plates, to harvest standing crops in a field. While the harvesting elements 420 are illustrated and described herein as deck plates, it should be appreciated that the harvesting element(s) 420 can have other configurations suitable for removing standing crops, such as a cutterbar, sickle, etc. The header frame 410 may, in some exemplary embodiments, include a hood 411 that can house and protect components of the header 400 during operation, as well as assist in guiding cut crop material toward a conveyor 430, shown as an auger, that can convey the cut crop material toward the adjustable feeder housing 240, which is previously described. The header 400 may be adjustable by connecting to the feeder housing 240, as is known.

As can be seen, the header 400 includes a divider 450 that is pivotably carried by the header frame 410 and can direct standing crop material toward the harvesting elements 420. As used herein, the divider 450 is "pivotably carried" by the header frame 420 in the sense that the divider 450 is connected to the header frame 420 in a manner that allows pivoting of the divider 450 relative to the header frame 420 to, for example, adjust a divider angle Dα defined by the divider 450 with respect to a ground plane GP. In some exemplary embodiments, the divider 450 may be pivotably connected to the header frame 410 at a pivot point 451, which may be a pivot pin or similar element, defining a pivoting axis of the divider 450. Optionally, a pivot lock 452 may be associated with the pivot point 451 to reversibly lock and prevent pivoting of the divider 450 when, for example, the header 400 is being transported. While only one divider 450 is illustrated in FIG. 4, the header 400 includes a plurality of dividers 450 that each define a respective divider angle Dα and, in some exemplary embodiments, may be identical to one another.

Each of the dividers 450 has a respectively coupled actuator 460 that is carried by the header frame 410 and is configured to control the respective divider angle Dα of the coupled divider 450 independently of movement of the header frame 410. In some exemplary embodiments, the actuators 460 can be hydraulic, pneumatic, and/or electric actuators that cause pivoting of their respectively coupled dividers 450 relative to the pivot point 451. By having each divider 450 coupled to a separate actuator 460 that can control the respective divider angle Dα, the respective divider angle Dα of each divider 450 can be controlled separately, which may be useful in certain scenarios. As shown in FIG. 4, each of the actuators 460 can be directly linked to its respectively coupled divider 450 by, for example, an adjustable length rod 461.

The header 400 can further include a controller 470 that is operatively coupled to each of the actuators 460 and configured to selectively activate each of the actuators 460 independently from other actuators 460. For example, the controller 470 can be configured to activate each of the actuators 460 individually or, in some exemplary embodiments, activate some or all of the actuators 460 together. In some exemplary embodiments, the controller 470 can be configured to activate all of the coupled actuators 460 simultaneously. In this sense, the controller 470 selectively activating one or more actuators 460 to control the respective divider angle Dα of the respectively coupled divider 450 allows the controller 470 to control the divider angle Dα of each individual divider 450 by selective control of the respectively coupled actuator 460.

In some exemplary embodiments, the header 400 can be mounted to the previously described adjustable feeder housing 240 defining a face angle Fα with respect to the ground plane GP. When the header 400 is mounted to the feeder housing 240, an angle sensor 471 associated with the feeder housing 240 can be operatively coupled to the controller 470 so the controller 470 can detect changes in the face angle Fα of the feeder housing 240, similarly to the previously described angle sensor 391. As previously described, the change in the face angle Fα also tends to change the divider angle Dα and cut height, as illustrated in dashed lines in FIG. 4. The controller 470 can be configured to detect a change in the face angle Fα based on signals from the angle sensor 471 and activate one or more of the actuators 460 to maintain the respective divider angle Dα of at least one respectively coupled divider 450 constant responsively to detecting the change in the face angle Fα. For example, the controller 470 can be configured to activate one or more actuators 460 to pivot the front of its respectively coupled divider 450 upwards when the controller 470 detects the feeder housing 240 has pivoted forward to compensate for the corresponding lowering of the header frame 410 and maintain a constant cut height of crops. It should be appreciated that, in such a scenario, some or all of the actuators 460 can be activated, depending on the respective height and divider angle Dα of each individual divider 450.

Figure 5:
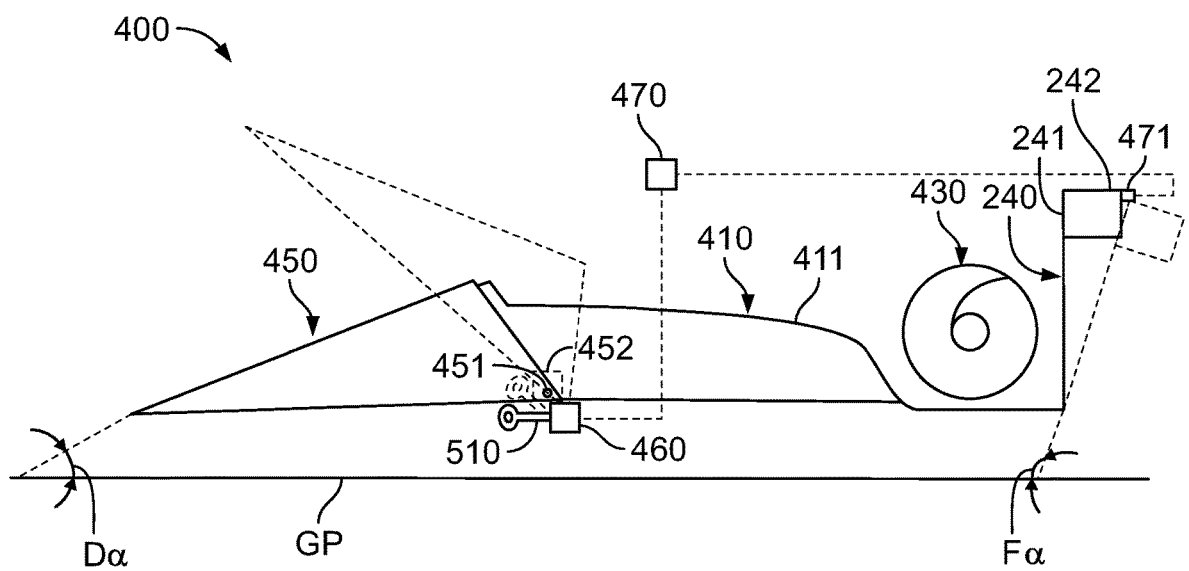
FIG. 5 is a side view of an alternative exemplary embodiment of the header shown in FIG. 4.

Referring now to FIG. 5, an alternative embodiment of the header 400 is illustrated. Rather than having the actuators 460 each directly coupled to their respective dividers 450, as shown in FIG. 4, one or more of the actuators 460 can be coupled to a divider support 510 that bears on its respective divider 450, similar to previously described divider support 271. Activation of the actuator 460, therefore, causes pivoting of the divider support 510 and a corresponding pivoting of the respective divider 450 relative to the pivot point 451. In all other respects, the header 400 shown in FIG. 5 can be similar to the header 400 shown in FIG. 4.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A harvester, comprising:
a chassis; and
a header carried by the chassis, the header including:
   a header frame;
   at least one harvesting element carried by the header frame;
   a plurality of dividers pivotably carried by the header frame, each of the plurality of dividers defining a respective divider angle relative to a ground plane;
   a plurality of actuators carried by the header frame, each of the plurality of actuators coupling to a respective one of the plurality of dividers and being configured to control the respective divider angle of the respectively coupled divider;
   a controller operatively coupled to the plurality of actuators and configured to activate each of the plurality of actuators independently of the other actuators; and
an adjustable feeder housing carried by the chassis and defining a face angle relative to the ground plane and an angle sensor associated with the feeder housing and operatively coupled to the controller, the controller being configured to detect a change in the face angle and activate at least one of the plurality of actuators responsively to detecting the change in the face angle.

2. The harvester of claim 1, wherein the controller is configured to activate each of the plurality of actuators responsively to detecting the change in the face angle.

3. The harvester of claim 1, further comprising a divider support connected to one of the plurality of actuators and bearing on a respective one of the plurality of dividers.

* * * * *